(12) United States Patent
Keller et al.

(10) Patent No.: US 7,954,854 B2
(45) Date of Patent: Jun. 7, 2011

(54) SEAT BELT RETRACTOR AND TORSION BAR PROVIDING SECONDARY LOAD LIMITING

(75) Inventors: Gerald J. Keller, Shelby Township, MI (US); Kurt W. Schulz, Romeo, MI (US)

(73) Assignee: Autoliv ASP, Inc., Ogden, UT (US)

( * ) Notice: Subject to any disclaimer, the term of this patent is extended or adjusted under 35 U.S.C. 154(b) by 228 days.

(21) Appl. No.: 12/173,608

(22) Filed: Jul. 15, 2008

(65) Prior Publication Data
US 2010/0013205 A1 Jan. 21, 2010

(51) Int. Cl.
*B65H 75/48* (2006.01)
(52) U.S. Cl. ............................ 280/807; 242/379.1
(58) Field of Classification Search .................. 280/805, 280/807; 297/474; 242/379.1
See application file for complete search history.

(56) References Cited

U.S. PATENT DOCUMENTS

| | | | | |
|---|---|---|---|---|
| 5,320,385 | A * | 6/1994 | Schmid et al. | 280/805 |
| 5,788,177 | A * | 8/1998 | Keller et al. | 242/379.1 |
| 5,899,402 | A * | 5/1999 | Koning | 242/379.1 |
| 6,012,667 | A * | 1/2000 | Clancy et al. | 242/379.1 |
| 6,065,706 | A * | 5/2000 | Koning | 242/379.1 |
| 6,105,893 | A * | 8/2000 | Schmidt et al. | 242/374 |
| 6,105,894 | A | 8/2000 | Singer et al. | |
| 6,206,315 | B1 * | 3/2001 | Wier | 242/379.1 |
| 6,216,972 | B1 * | 4/2001 | Rohrle | 242/379.1 |
| 6,299,091 | B1 * | 10/2001 | Blackadder et al. | 242/379.1 |
| 6,409,115 | B1 * | 6/2002 | Specht et al. | 242/379.1 |
| 6,416,007 | B1 * | 7/2002 | Stegmeier | 242/379.1 |
| 6,474,587 | B2 * | 11/2002 | Kanamori et al. | 242/379.1 |
| 6,568,621 | B2 * | 5/2003 | Hiramatsu et al. | 242/379.1 |
| 6,616,081 | B1 * | 9/2003 | Clute et al. | 242/379.1 |
| 6,641,075 | B2 * | 11/2003 | Specht | 242/374 |
| 6,669,133 | B2 * | 12/2003 | Palliser et al. | 242/379.1 |
| 6,820,901 | B2 * | 11/2004 | Wier | 280/806 |
| 6,848,644 | B2 | 2/2005 | Eberle et al. | |
| 6,969,089 | B2 * | 11/2005 | Klingauf et al. | 280/805 |
| 7,025,297 | B2 * | 4/2006 | Bell et al. | 242/384 |
| 7,273,191 | B2 * | 9/2007 | Clute et al. | 242/379.1 |

(Continued)

FOREIGN PATENT DOCUMENTS

| | | |
|---|---|---|
| DE | 19681341 C1 | 8/2002 |
| DE | 10122910 A1 | 11/2002 |
| DE | 10204477 A1 | 8/2003 |
| EP | 0627345 | 12/1994 |

*Primary Examiner* — Paul N Dickson
*Assistant Examiner* — Timothy D Wilhelm
(74) *Attorney, Agent, or Firm* — Sally J. Brown; Brinks Hofer Gilson & Lione

(57) ABSTRACT

A torsion bar, constructed in accordance with the teachings of the present invention, an elongated bar has a first end, a second end, and a mid-section between the first and second ends. The first end of the elongated bar has a material void. The first end preferably has a diameter substantially equal to a diameter of the mid-section. In one design, the material void is a slot extending longitudinally, and the first end may also define a plurality of circumferentially spaced slots extending longitudinally. In another design, the material void is a bore extending longitudinally, and the first end may also define a plurality of slots extending longitudinally and extending from the bore through an exterior surface of the elongated bar to leave a plurality of fingers at the first end. In these designs and other, the torsion bar and the material void may be cold forged, thereby eliminating a second forming step. The torsion bar may also include a plurality of circumferentially spaced ribs extending longitudinally from the first end to the second end.

16 Claims, 9 Drawing Sheets

U.S. PATENT DOCUMENTS

| | | | |
|---|---|---|---|
| 7,338,003 B2 * | 3/2008 | Takamatsu et al. | 242/379.1 |
| 7,410,113 B2 * | 8/2008 | Keller et al. | 242/379.1 |
| 7,637,451 B2 * | 12/2009 | Gentner et al. | 242/379.1 |
| 2006/0163410 A1 * | 7/2006 | Blum et al. | 242/379.1 |
| 2006/0220368 A1 * | 10/2006 | Takao et al. | 280/801.1 |
| 2007/0023558 A1 * | 2/2007 | Humbert | 242/382 |
| 2008/0246266 A1 * | 10/2008 | Oesterle et al. | 280/805 |

* cited by examiner

SEAT BELT RETRACTOR AND TORSION BAR PROVIDING SECONDARY LOAD LIMITING

FIELD OF THE INVENTION

The present invention relates generally to a seat belt restraint system for restraining an occupant of an automobile, and more particularly relates to seat belt retractors having torsion bars.

BACKGROUND OF THE INVENTION

A retractor is a standard component of a seat belt restraint system which includes a spindle receiving the webbing material of the seat belt. The spindle is used to wind up and store the webbing. Generally, the spindle is locked in place upon detection at a potential accident situation in order to restrain the occupant via the seat belt. Recently, retractors have been designed having one or more force limiting elements which are structured to allow the spindle to rotate and pay out the webbing material of the seat belt upon reaching predetermined force levels between the occupant and seat belt. In this manner, the restraint force imposed on the occupant can be limited in a controlled manner, providing a certain load limitation characteristics.

More recent enhancements in load limiters have been directed to addressing the differences in restraining forces required to safely bring occupants to rest. For example, higher restraining forces may be initially applied, followed by lower restraining forces at a later point during an emergency event. To this end, multi-stage load limiting devices have been developed. A multi-stage torsion bar, for example, is such a device. The multi-stage torsion bar is essentially two torsion bars that are axially aligned and joined at respective ends. The appropriate stage or portion of the torsion bar may be selectively activated to provide a secondary load limiting characteristic as desired.

BRIEF SUMMARY OF THE INVENTION

The present invention provides a seat belt retractor that provides secondary load limitation characteristics while reducing complexity and cost of manufacturing. One embodiment of the retractor generally includes a spool receiving a portion of the seat belt, and a torsion bar connected to the spool at a first end of the torsion bar. A notch is formed in the torsion bar. A locking mechanism is connected to the torsion bar at a second end of the torsion bar, and is operable to rotationally fix the second end of the torsion bar. The torsion bar twists when the locking mechanism fixes the second end of the torsion bar and a load is imposed on the seat belt to provide load limitation on the seat belt. Under this load, the torsion bar deforms over its length to provide a first load limitation characteristic, and the torsion bar deforms about the notch to provide a second load limitation characteristic.

According to more detailed aspects, the second load limitation characteristic preferably limits the load on the seat belt to a level less than the first load limitation characteristic. The second load limitation characteristic may have various profiles, such as a generally constant load limitation profile, or a degressive load limitation profile. The torsion bar is preferably structured such that the second load limitation characteristic occurs during displacement of the first end relative to the second end over at least 10 degrees.

In another embodiment of a torsion bar, constructed in accordance with the teachings of the present invention, an elongated bar has a first end, a second end, and a mid-section between the first and second ends. The first end of the elongated bar has a material void. The first end preferably has a diameter substantially equal to a diameter of the mid-section. In one design, the material void is a slot extending longitudinally, and the first end may also define a plurality of circumferentially spaced slots extending longitudinally. In another design, the material void is a bore extending longitudinally, and the first end may also define a plurality of slots extending longitudinally and extending from the bore through an exterior surface of the elongated bar to leave a plurality of fingers at the first end. In these designs and other, the torsion bar and the material void may be cold forged, thereby eliminating a second forming step. The torsion bar may also include a plurality of circumferentially spaced ribs extending longitudinally from the first end to the second end.

In another embodiment of a torsion bar, constructed in accordance with the teachings of the present invention, an elongated bar has a first end, a second end, and a mid-section between the first and second ends. The first end of the elongated bar defines a plurality of circumferentially spaced ribs extending longitudinally. The first end of the bar also includes a material void defined by a plurality of slots extending longitudinally.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
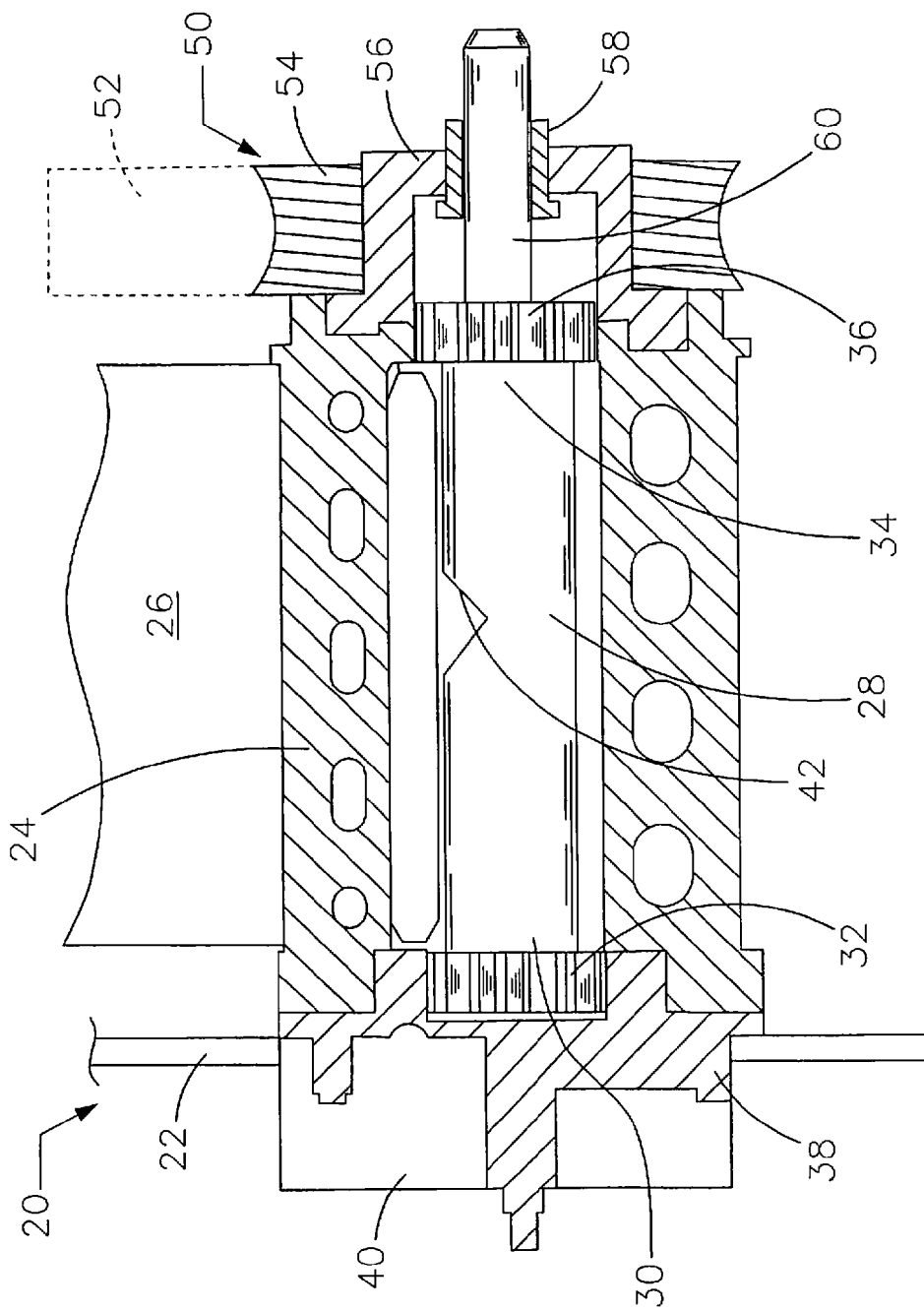
FIG. 1 is a cross-sectional view of a retractor constructed in accordance with the teachings of the present invention.

Turning now to the figures, FIG. 1 depicts a cross-sectional view of a seat belt retractor 20 constructed in accordance with the teachings of the present invention. The retractor 20 generally includes a frame 22 to which a spindle 24 is mounted for rotation. The spindle 24 is connected to the seatbelt webbing 26 for winding up or dispensing of the seat belt, as is known in the art. A torsion bar 28 is positioned within the spindle 24 for control and rotation of the spindle. The first end 30 of the torsion bar 28 includes a spline 32, and a second end 34 of the torsion bar 28 is located opposite the first end 30 and also includes a spline 36. The first spline 32 is connected to a treadhead 38. A locking mechanism 40 is operably connected to the treadhead 38, and upon detection of an impact event or other vehicle conditions, selectively fixes rotation of the treadhead 38, as is known in the art. Upon locking of the treadhead 38, the spline 32 and first end 30 of the spindle 28 is rotationally fixed.

The second end 34 of the torsion bar 28 is directly coupled to the spindle 24 via spline 36. When the locking mechanism 40 fixes the treadhead 38 and first end 30 of the torsion bar 28, such as during a restraining event twisting of the torsion bar 28 i.e. rotation of the second end 34 relative to the first end 30) allows some rotation of the spindle 34 to pay out of the seat belt webbing 26, thereby limiting the force levels imposed on an occupant restrained by the seat belt.

The second spline 36 is also coupled to a pretensioner 50. It will be recognized by those skilled in the art that the pretensioner 50 is optional. The pretensioner 50 generally includes an activating mechanism 52, such as a pyrotechnic device, which operably rotates a drive wheel connected to an endcap 56. A clutch (not shown) may be operatively connected between the drive wheel 54 and the endcap 56. The endcap 56 is retainably mounted on a bushing 58 and pin 60, although the bushing 58 is optional and could also be integrated into the endcap 56. The endcap 56 is also connected to the spline 36 for rotation therewith. In this manner, the pretensioner 50 may operably rotate the spindle 24 to retract the seatbelt webbing 26 and remove any slack between the occupant and the seatbelt webbing 26.

Figure 2:
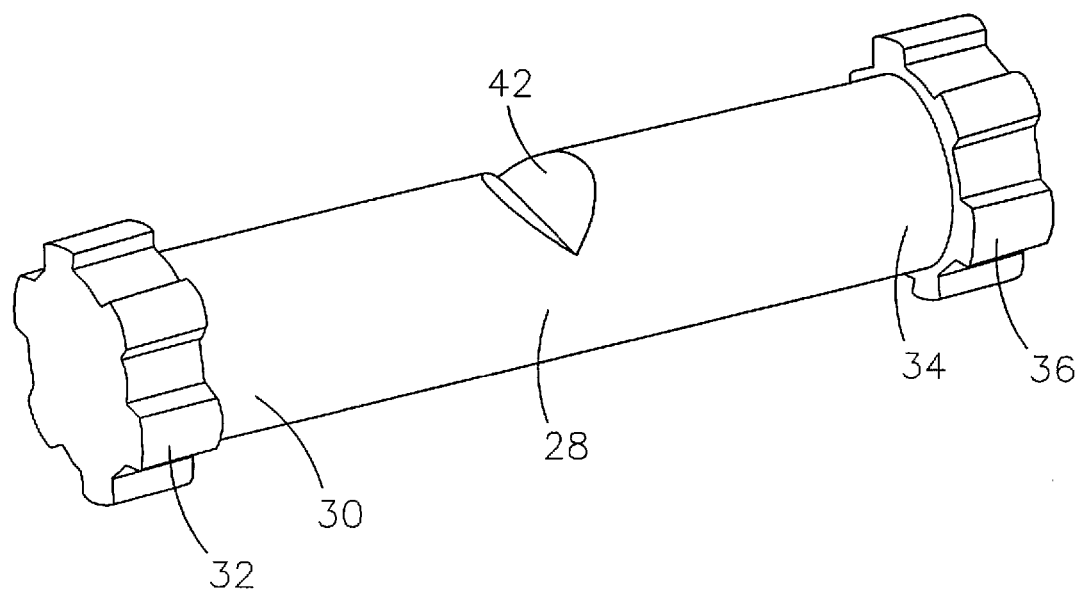
FIG. 2 is a perspective view of a torsion bar forming a portion of the retractor depicted in FIG. 1.

As best seen in FIGS. 1 and 2, the torsion bar 28 includes a notch 42 formed between the first and second ends 30, 34. The notch 42 has generally been shown as a V-shaped groove, although the notch may take many shapes and forms including curved, semicircular, square, rectangular and the like. The notch 42 may likewise have many depths and thicknesses depending on the particular application, as will be readily understood by those of ordinary skill in the art. The notch 42 represents a reduced diameter portion and removal of material from the torsion bar 28, and may be formed by a broaching or cutting tool which has minimal processing cost. Notably, this torsion bar 28 having notch 42 provides a secondary load limit limitation characteristic, without the need for a second torsion bar or other secondary load limiting element.

Figure 3:
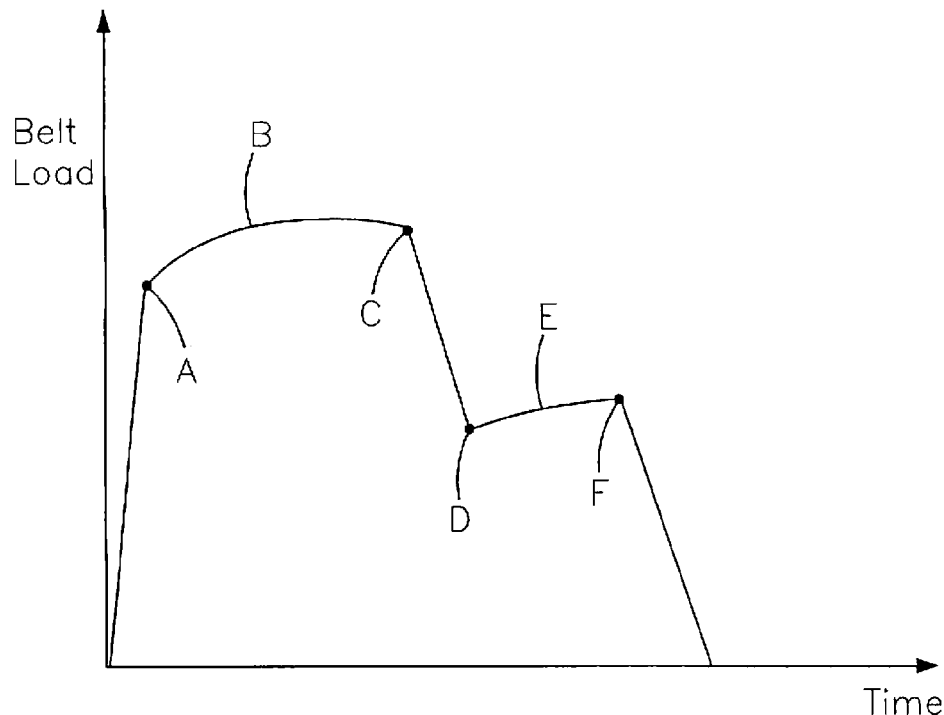
FIGS. 3 and 4 are graphs showing belt load over time.

Generally, upon detection of an event that induces locking of the treadhead 38, the seat belt webbing 28 will begin loading up under the force of the occupant. A first load limitation characteristic is provided through the twisting of the torsion bar 28 along its length between the first end 30 and second end 34, as with a traditional torsion bar. Upon reaching a certain torque level or certain relative rotation between the first and second ends 30, 34, typically about 10% of relative rotation, the torsion bar 28 will begin to classically deform about the notch 42. This latter deformation of the torsion bar 28 provides a secondary load limitation characteristic that limits the load between the occupant and the seat belt webbing 26. Several different secondary load limitation characteristics may be provided, including lower load limitation or a digressive profile. For example, in the graph of FIG. 3 showing belt load over time, upon locking the treadhead 38 the belt load rapidly increases to Point A. The first load limitation characteristic B is provided for a period of time while the torsion bar 28 twists (which usually results in some plastic deformation). Upon reaching Point C, the torsion bar 28 begins to plastically deform about the notch 42, and the belt load is quickly reduced to Point D. Then, for a period of time, the second load limitation characteristic E is provided which has a lower level belt load, until Point F where the torsion bar 28 fails through sheer loading and material deformation, whereby the belt load is rapidly decreased. The second load limitation characteristic has been shown as generally constant.

Figure 4:
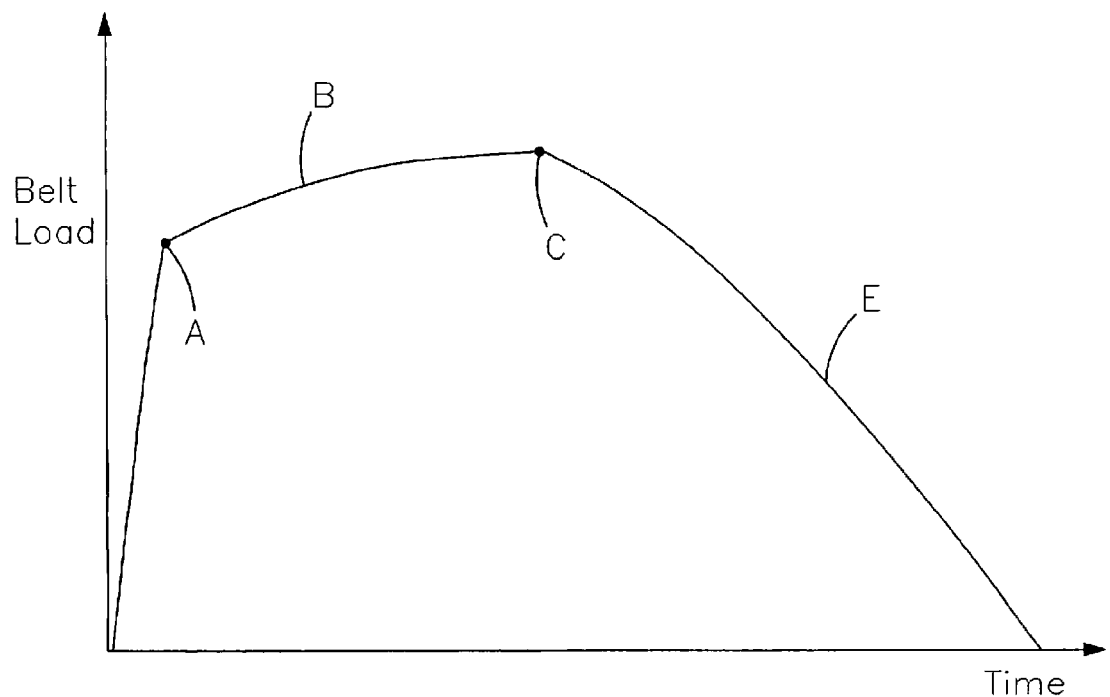

In the graphs of FIG. 4, a secondary load limitation characteristic having a digressive profile has been depicted. Upon locking of the treadhead 38, the belt load rapidly rises to Point A. For a period of time, the first load limitation characteristic B is provided by twisting of the torsion bar 28. Upon reaching Point C, the torsion bar 28 will begin deforming about the notch 42 in the manner that provides a sloping decrease or degressive profile to the secondary load limitation characteristic E.

Figure 5:
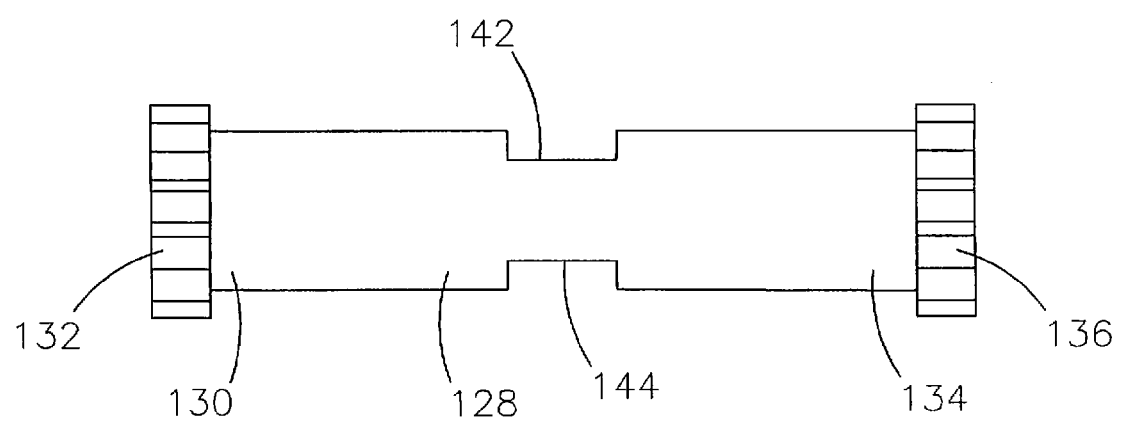
FIG. 5 is a front view of another embodiment of a torsion bar constructed in accordance with the teachings of the present invention.

Accordingly, it will be recognized by those of ordinary skill in the art that the shape and dimensions of the notch 42 can determine the type of secondary load limitation characteristic E that is provided. For example, FIG. 5 depicts a torsion bar 128 having a first end 130 and spline 132, as well as a second end 134 and spline 136 opposite the first end 130. In this embodiment, two notches 142, 144 have been provided. The first and second notches 142,144 are generally rectangular and may be machined into the torsion bar 128. The first and second notches 142, 144 have been shown as axially aligned, although they may be axially spaced apart (overlapping or non-overlapping). The notches 142, 144 are preferably circumferentially spaced apart by 180°, although they may be circumferentially spaced apart by any degree or non-circumferentially spaced apart. Similarly, the first and second notches 142, 144 may have similar dimensions, or they may have dissimilar dimensions. By way of non-limiting examples, torsion bars having diameters ranging from about 7 to about 11 millimeters preferably include one or more notches ranging in size from about 0.5 mm to 0.3 mm, and most preferably between 1 to 2 mm.

Figure 6:
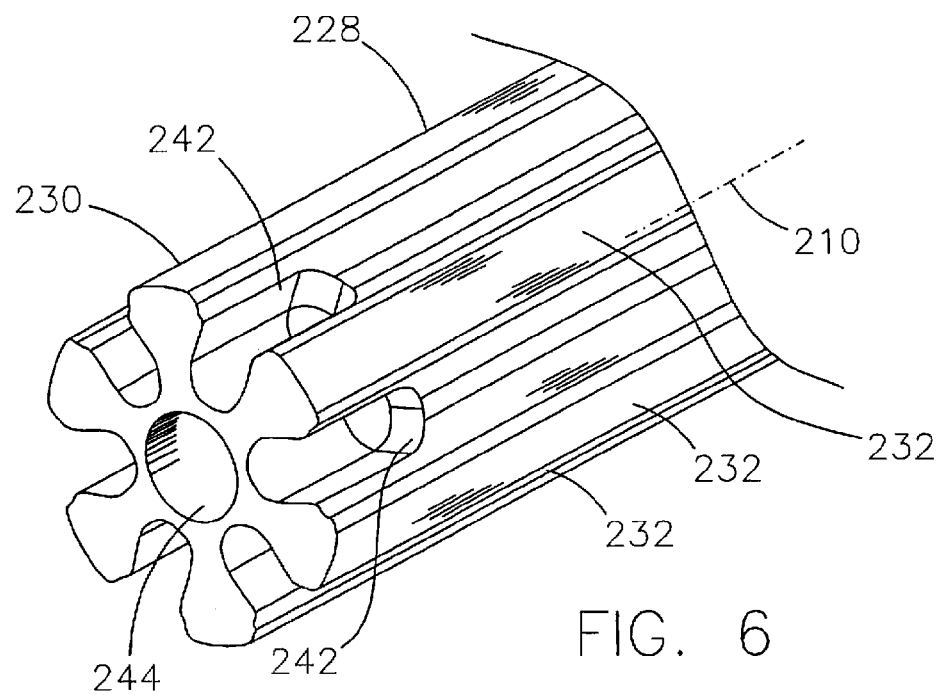
FIG. 6 is a partial perspective view of yet another embodiment of a torsion bar constructed in accordance with the teachings of the present invention.

It will also be recognized by those skilled in the art that the notch or other form of material removal in the torsion bar may occur at the ends of the torsion bar, rather than between the ends as in the prior embodiments. Turning now to FIG. 6, one half of a torsion bar 228 has been depicted, showing in the first end 230 thereof. The second end of the torsion bar 228 is preferably (although not necessarily) formed and shaped identical to the first end 230, and therefore has not been depicted in FIG. 6. In this embodiment, the torsion bar 228 includes a plurality of circumferentially spaced ribs 232 on its outer surface, six ribs being shown in the embodiment of FIG. 6. Accordingly, the portions of the ribs 232 at the first end 230 serve as the spline for connecting the torsion bar 228 to the treadhead and spindle (depending on the end of the torsion bar 228). Between each of the ribs 232, longitudinally extending notches 242 have been formed. Likewise, a central bore 244 has also been formed in the torsion bar 228 along its central axis 210 (i.e., its axis of rotation).

Accordingly, the embodiment of FIG. 6 provides different types of material voids, namely in the form of longitudinally extending notches 242 and a central bore 244. As with the prior embodiments, upon a loading of the torsion bar 228, twisting of the torsion bar provides a first load limitation characteristic, until the point the point where the torsion bar 228 begins to deform about the first end 230, proximate its notches 242 and bore 244, thereby providing a second load limitation characteristic.

It will be also be recognized by those skilled in the art that the torsion bar 228 and its ribs 232 can be formed during the cold forging process, thereby eliminating the need for a second manufacturing step of forming the splines. Likewise, the longitudinal notches 242 and bore 244 can be machined into the ends of the torsion bar 228, or they can also be cold forged as the design is captured inside the envelope of the torsion bar extrusion. In this manner, the number of steps and manufacturing complexity of the torsion bar 228 is greatly reduced, while at the same time providing a single torsion bar that provides both first and second load limitation characteristics. Cold forging is well known in the art, and a person of ordinary skill in the arts will readily be able to form the structures herein in such cold forgoing processes.

It will be recognized by those skilled in the art that many different variations in the removal of material at the ends of the torsion bar are possible to provide a secondary load limitation characteristic. For example, only the central bore 244 or only the longitudinal notches 242 may be provided. Likewise, the number of notches may also be varied. As with all embodiments, the dimensions of the notches, bores or other areas of material removal may be varied and controlled in order to provide the desired secondary load limitation characteristic. For example, in FIG. 7, one half of a torsion bar 328 has been depicted having a first end 330 and a plurality of longitudinally extending ribs 332. In this embodiment, a plurality of longitudinally extending notches 342 have been formed between the ribs 332 at the first end 330. Likewise, a large central bore 344 has been formed, which extends through to the longitudinally extending notches 342. Essentially, this leaves a plurality of fingers 350 which serve as the spline for connecting the torsion bar 328 to either the treadhead or spindle (depending on the end of the torsion bar 328).

Figure 7:
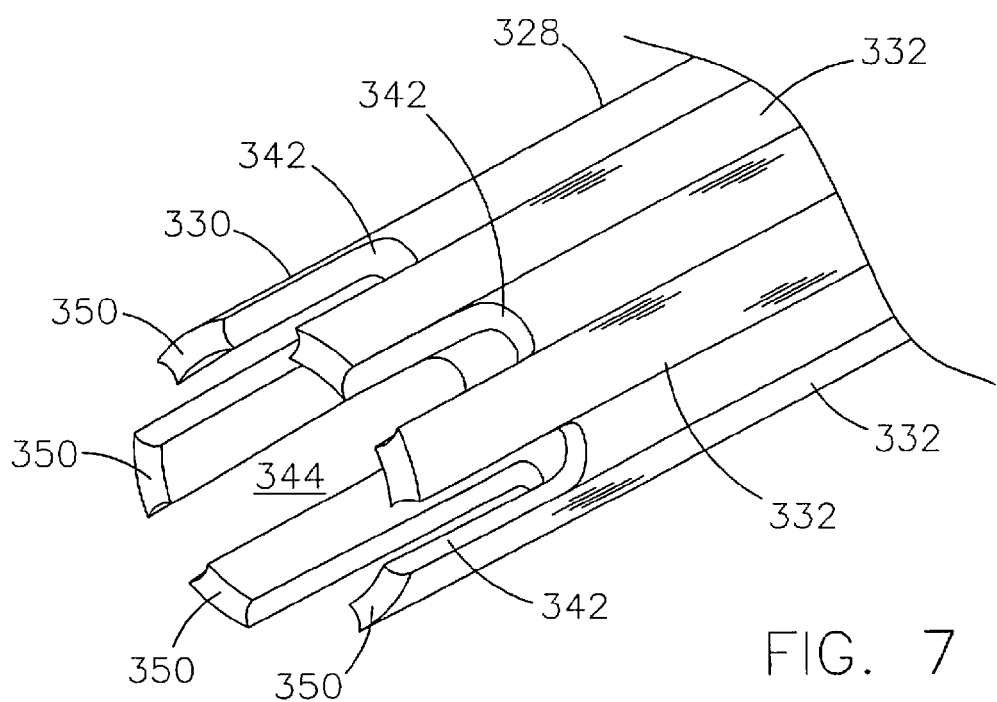
FIG. 7 is a partial perspective view of still yet another embodiment of a torsion bar constructed in accordance with the teachings of the present invention.

Unlike the earlier embodiments, the embodiments of FIGS. 6 and 7 do not require a shearing of the torsion bar, but rather utilize a bending failure mode, which serves to disconnect the torsion bar from either the treadhead and/or the spindle. Generally, the spindle and treadhead may be formed of a die-cast material or other material that is harder than the torsion bar, causing deformation and bending of the torsion bar. In fact, the torsion bar may "skip" along the corresponding teeth or spline formed in the treadhead or spindle to provide some limitation on the rotation of the spindle and playing out of the seatbelt webbing.

Accordingly, it will be recognized that the retractor and torsion bar of the present invention provide both a primary and secondary load limitation characteristic (including those depicted in FIGS. 3 and 4) on the belt load during a crash or other emergency event, without the need for a second load limiting member. Furthermore, the torsion bar and its features providing the secondary load limitation characteristic may be formed by cold forging, without the need for a second machining, broaching or cutting. This serves to reduce manufacturing complexity and cost, while at the same time a variety of types of secondary load limitation characteristics maybe provided by controlling the shape and dimensions of the torsion bar.

Figure 8:
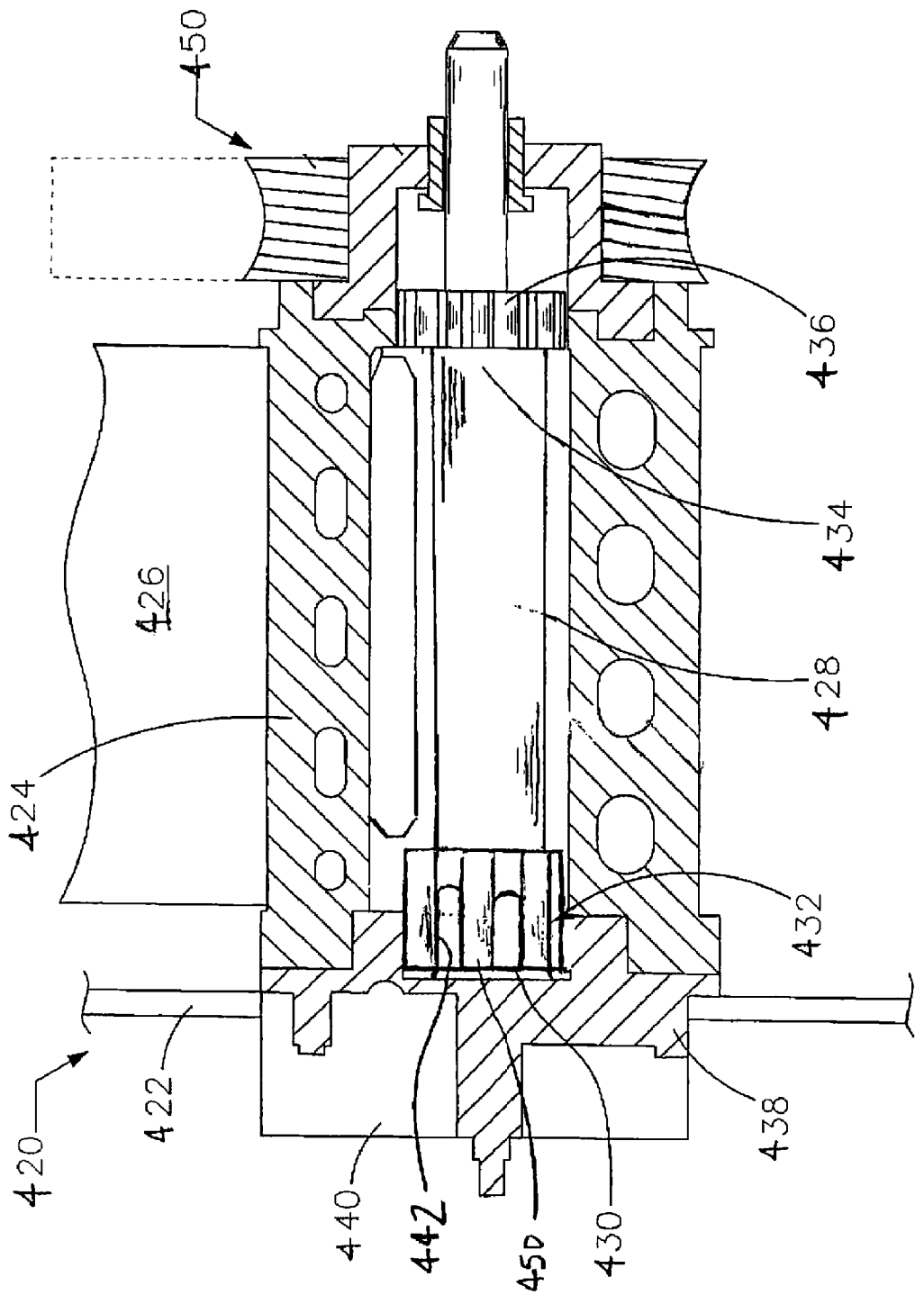
FIG. 8 is a cross-sectional view of another embodiment of a retractor constructed in accordance with the teachings of the present invention.

Although the embodiments of FIGS. 6 and 7 have shown longitudinally extending ribs extending along the length of the torsion bar, it will be recognized that the torsion bar may be generally cylindrical in shape, and through formation material voids at the ends of the torsion bar (such as the longitudinally extending slots depicted) a spline may be integrally formed at each end of the torsion bar without the complexities of a traditional spline. For example, FIG. 8 depicts an alternate embodiment of a retractor 420 having a frame 422, spindle 424, seatbelt webbing 426 and a locking mechanism 440 such as previously described in the prior embodiments. In this embodiment, the torsion bar 428 only has its first end 430 formed to define a plurality of longitudinally extending ribs 432, similar to the embodiment of FIG. 7. As depicted, the mid-section of the torsion bar 428 does not include the ribs 432 and may have a smaller diameter than the first end 430, although it could have an outer diameter matching the spline at the first end 430.

As shown, the material voids include the plurality of longitudinally extending notches 442 that have been formed between the ribs 432 at the first end 430. Likewise, a large central bore 444 has been formed, which extends through to the longitudinally extending notches 442 leaving a plurality of fingers 450 which serve as the spline for connecting the torsion bar 428 to the tread head 438. Of course, the second end 434 of the torsion bar 428 could also be similarly formed to define its spline 436 and provide additional load limitation. In this manner, different load limitation characteristics can be designed into the retractor 420 and torsion bar 428, while the torsion bar and its features providing the different load limitation characteristic may be formed by cold forging, without the need for a second process of machining, broaching or cutting.

Figure 9:
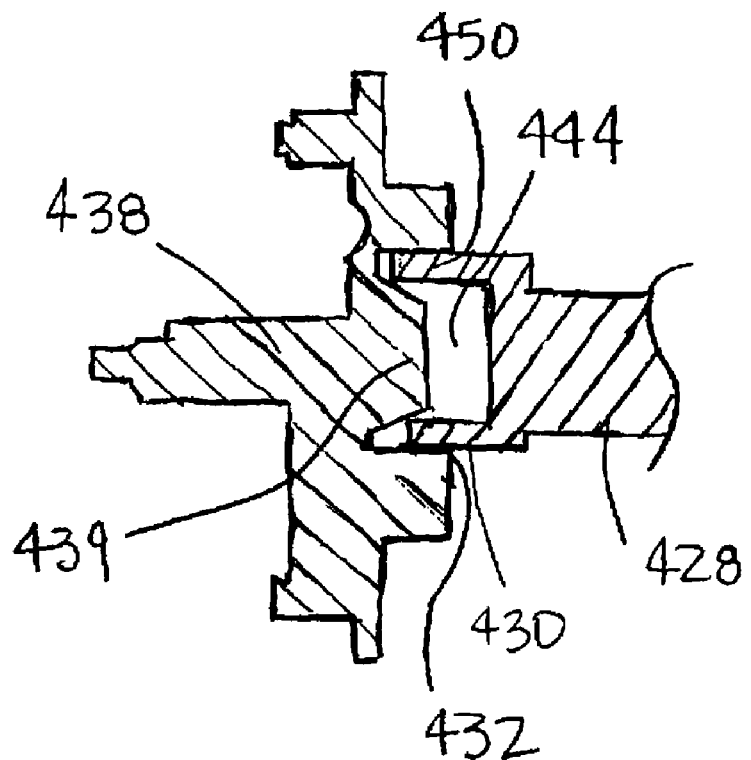
FIG. 9 is a partial cross-sectional view of the retractor depicted in FIG. 8.
Figure 10:
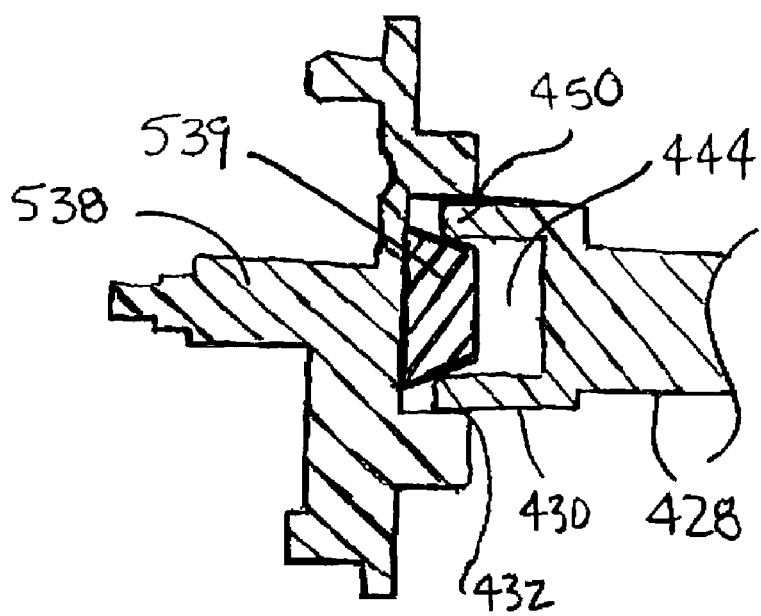
FIG. 10 is a partial cross-sectional view of an alternate embodiment of the retractor depicted in FIGS. 8 and 9, constructed in accordance with the teachings of the present invention.

A partial cross-sectional view of the embodiment of FIG. 8 has been shown in FIG. 9, and further shows that the tread head 438 may be shaped to define a support hub 439 sized to radially support the first end 430 of the torsion bar 428, and in particular the plurality of fingers 450 defining the spline. The support hub 439 preferably has a conical or frusto-conical shape, although other cylindrical or tapered shapes may be employed. FIG. 10 depicts a variation of the embodiment of FIG. 9, wherein the support hub 539 is formed separately from the tread head 538, but is still sized, shaped and positioned to support the first end 430 of the torsion bar 428 and its fingers 450.

Figure 11:
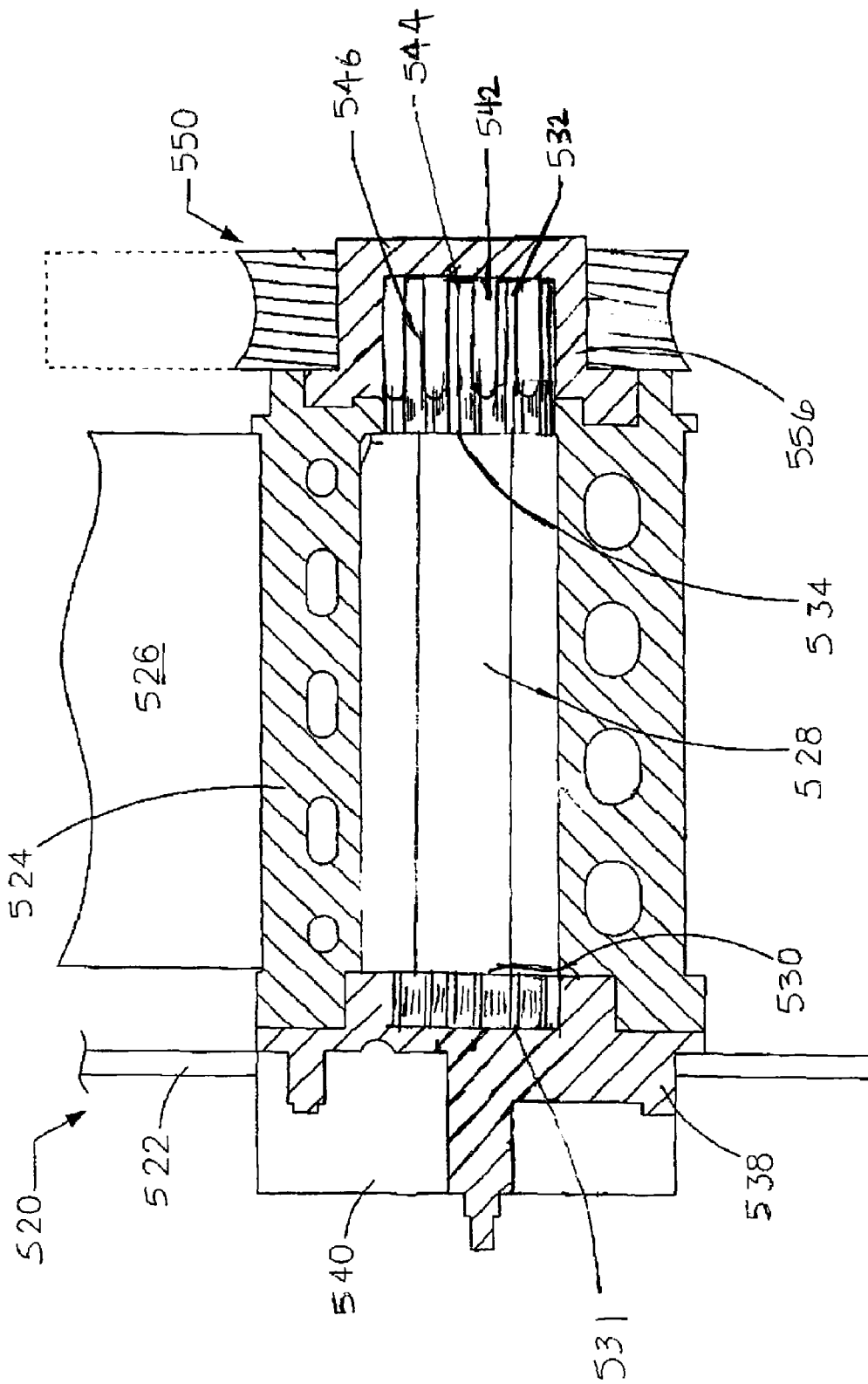
FIG. 11 is a cross-sectional view of another embodiment of a retractor constructed in accordance with the teachings of the present invention.

The uniquely formed end of the torsion bar, e.g. having cold forged material voids that provide a spline and load limiting features, may also be incorporated on the pretensioner side of the retractor. For example, FIG. 11 depicts an alternate embodiment of a retractor 520 having a frame 522, spindle 524, seatbelt webbing 526 and a locking mechanism 540 such as previously described in the prior embodiments. In this embodiment, the torsion bar 528 has its first end 530 formed with a spline 531, while the second end 534 proximate the pretensioner 550 defines a plurality of longitudinally extending ribs 532, similar to the embodiment of FIG. 7. As depicted, the mid-section of the torsion bar 528 does not include the ribs 532 and may have a smaller diameter than the second end 534, although it could have an outer diameter matching the spline at the second end 534.

As shown, the material voids include the plurality of longitudinally extending notches 542 that have been formed between the ribs 532 at the second end 534. Likewise, a large central bore 544 has been formed, which extends through to the longitudinally extending notches 542 leaving a plurality of fingers 546 which serve as the spline for connecting the torsion bar 528 to the spool 524 and to the end cap 556 and pretensioner 550. When the second end 534 of the torsion bar 528 is formed in the above-described manner, the second end 534 features can be used to provide pre-twist prevention (i.e. premature loading of the torsion bar 528), while the first end 530 of the torsion bar may still be fixed via the tread head 538 and locking mechanism 540. That is, the end features allow the use of a smaller diameter torsion bar in conjunction with a high power pretensioner, because the end features will provide pre-twist prevention. At the same time, different load limitation characteristics can be designed into the retractor 520 and torsion bar 528, while the torsion bar and its features providing the different load limitation characteristic (e.g. end structures defined by material voids) may be formed by cold forging, without the need for a second process of machining, broaching or cutting.

Figure 12:
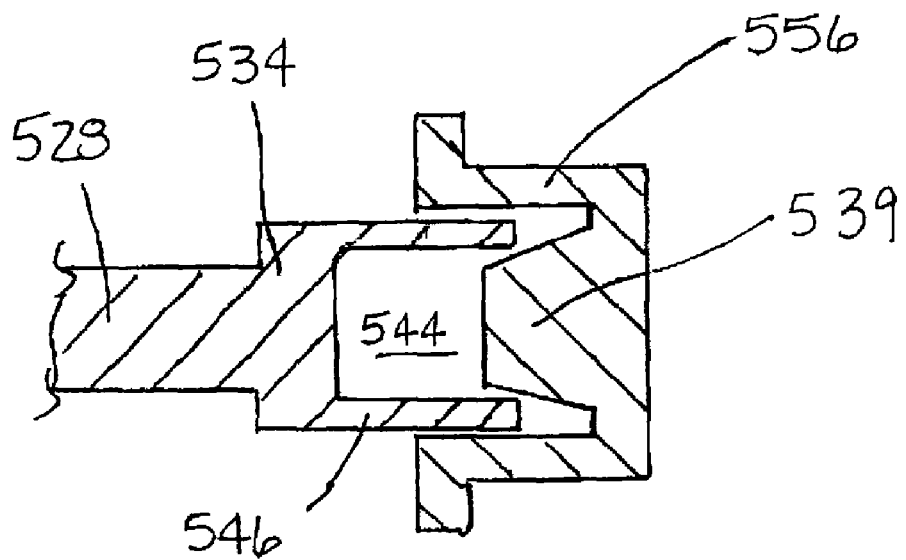
FIG. 12 is a partial cross-sectional view of the retractor depicted in FIG. 11.
Figure 13:
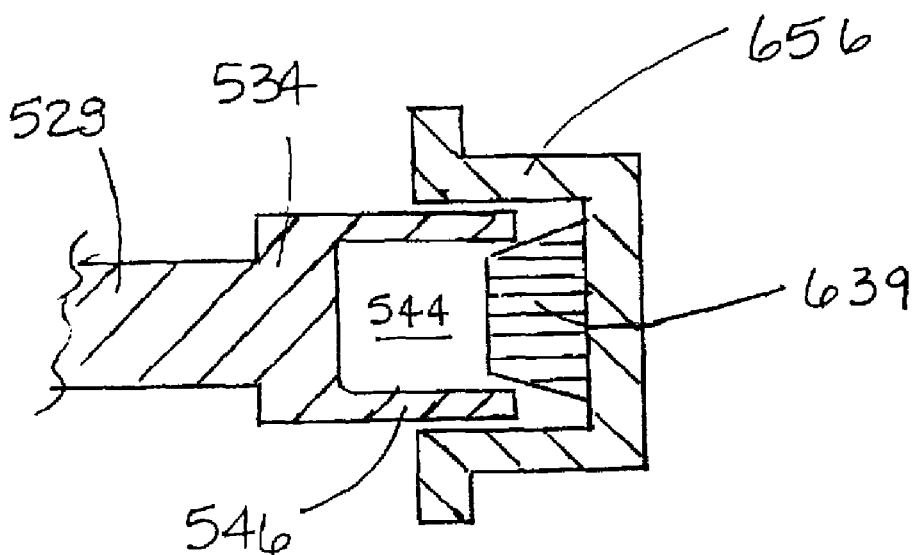
FIG. 13 is a partial cross-sectional view of an alternate embodiment of the retractor depicted in FIGS. 11 and 12, constructed in accordance with the teachings of the present invention.

A partial cross-sectional view of the embodiment of FIG. 11 has been shown in FIG. 12, and further shows that the end cap 556 may be shaped to define a support hub 639 sized to radially support the second end 534 of the torsion bar 528, and in particular the plurality of fingers 546 defining the spline. The support hub 639 preferably has a conical or frusto-conical shape, although other cylindrical or tapered shapes may be employed. FIG. 13 depicts a variation of the embodiment of FIG. 12, wherein the support hub 639 is formed separately from the end cap 556, but is still sized, shaped and positioned to support the second end 534 of the torsion bar 528 and its fingers 546.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A torsion bar for a seat belt retractor comprising:
   an elongated bar having a first end, a second end, and a mid-section between the first and second ends, the mid-section being solid;
   the first end of the elongated bar having a diameter substantially equal to a diameter of the mid-section; and
   the first end of the elongated bar having a material void, the material void including a plurality of slots formed at the outer periphery of the elongated bar and extending longitudinally, the material void further including a bore extending longitudinally, wherein the plurality of slots extend from an exterior surface of the elongated bar through to the bore to leave a plurality of fingers at the first end.

2. The torsion bar of claim 1, wherein the torsion bar and the material void are cold forged.

3. The torsion bar of claim 1, wherein the second end has a diameter substantially equal to a diameter of the mid-section, and wherein the second end has a second material void.

4. The torsion bar of claim 1, wherein the mid-section of the torsion bar has a smaller diameter than the first end of the torsion bar.

5. A torsion bar for a seat belt retractor comprising:
   an elongated bar having a first end, a second end, and a mid-section between the first and second ends;
   the first end of the elongated bar having a material void, wherein the torsion bar defines a plurality of circumferentially spaced ribs extending longitudinally from the first end to the second end.

6. The torsion bar of claim 5, wherein the material void is a slot extending longitudinally.

7. The torsion bar of claim 6, wherein the slot is formed at the outer periphery of the elongated bar.

8. The torsion bar of claim 5, wherein the first end defines a plurality of circumferentially spaced slots extending longitudinally.

9. The torsion bar of claim 5, wherein the torsion bar and the material void are cold forged.

10. The torsion bar of claim 5, wherein the first end defines a plurality of slots extending longitudinally.

11. The torsion bar of claim 5, wherein the torsion bar and plurality of ribs are cold forged.

12. A torsion bar for a seat belt retractor comprising:
    an elongated bar having a first end, a second end, and a mid-section between the first and second ends;
    the first end of the elongated bar defining a plurality of circumferentially spaced ribs extending longitudinally over a distance D; and
    the first end of the bar including having a material void defined by a plurality of slots extending longitudinally over a distance less than the distance D, the material void further including a bore extending longitudinally, wherein the plurality of slots extend from an exterior surface of the elongated bar through to the bore to leave a plurality of fingers at the first end.

13. The torsion bar of claim 12, wherein the torsion bar, the plurality of ribs and the plurality of slots are cold forged.

14. The torsion bar of claim 12, wherein the plurality of slots are circumferentially located between the plurality of ribs.

15. The torsion bar of claim 12, the plurality of slots extend through the outer periphery of the elongated bar.

16. The torsion bar of claim 12 wherein the torsion bar and the bore are cold forged.

* * * * *